United States Patent
Rajwar et al.

(10) Patent No.: US 9,311,241 B2
(45) Date of Patent: Apr. 12, 2016

(54) METHOD AND APPARATUS TO WRITE MODIFIED CACHE DATA TO A BACKING STORE WHILE RETAINING WRITE PERMISSIONS

(71) Applicant: Intel Corporation, Santa Clara, CA (US)

(72) Inventors: Ravi Rajwar, Portland, OR (US); Robert Chappell, Portland, OR (US); Zhongying Zhang, Portland, OR (US); Jason Bessette, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 437 days.

(21) Appl. No.: 13/730,957

(22) Filed: Dec. 29, 2012

(65) Prior Publication Data
US 2014/0189241 A1    Jul. 3, 2014

(51) Int. Cl.
  *G06F 12/08* (2006.01)
(52) U.S. Cl.
  CPC ...... *G06F 12/0815* (2013.01); *G06F 2212/507* (2013.01)
(58) Field of Classification Search
  None
  See application file for complete search history.

(56) References Cited

U.S. PATENT DOCUMENTS

| | | | | |
|---|---|---|---|---|
| 5,555,398 | A | * | 9/1996 | Raman .......................... 711/143 |
| 5,822,763 | A | * | 10/1998 | Baylor et al. ................. 711/141 |
| 7,376,799 | B2 | * | 5/2008 | Veazey et al. ................. 711/144 |
| 7,376,800 | B1 | | 5/2008 | Choquette et al. |
| 2003/0014602 | A1 | | 1/2003 | Shibayama et al. |
| 2004/0236912 | A1 | * | 11/2004 | Glasco .......................... 711/141 |
| 2008/0313411 | A1 | | 12/2008 | Sugizaki |
| 2009/0083488 | A1 | | 3/2009 | Madriles Gimeno et al. |

OTHER PUBLICATIONS

PCT/US2013/046912 Notification of Transmittal of the International Search Report and the Written Opinion of the International Searching Authority, mailed Aug. 30, 2013, 10 pages.
PCT/US2013/046912 Notification Concerning Transmittal of International Preliminary Report on Patentability, mailed Jul. 9, 2015, 7 pages.

* cited by examiner

*Primary Examiner* — Gary Portka
(74) *Attorney, Agent, or Firm* — Nicholson De Vos Webster & Elliott, LLP

(57) ABSTRACT

A method is described that includes performing the following for a transactional operation in response to a request from a processing unit that is directed to a cache identifying a cache line. Reading the cache line, and, if the cache line is in a Modified cache coherency protocol state, forwarding the cache line to circuitry that will cause the cache line to be written to deeper storage, and, changing another instance of the cache line that is available to the processing unit for the transactional operation to an Exclusive cache coherency state.

24 Claims, 8 Drawing Sheets

METHOD AND APPARATUS TO WRITE MODIFIED CACHE DATA TO A BACKING STORE WHILE RETAINING WRITE PERMISSIONS

FIELD OF INVENTION

The field of invention pertains generally to computing systems, and, more specifically, to a method and apparatus to write modified cache data to a backing store while retaining write permissions.

BACKGROUND

FIG. 1 shows a computing system 100 having a plurality of processing units 101_1 to 101_N. Processing units 101_1 to 101_N may correspond to instruction execution pipelines where system 100 corresponds to a processor, or, processing units 101_1 to 101_N may correspond to processors where system 100 corresponds to a multi-processor computing system.

Each of the processing units has its own respective internal one or more caching levels 102_1 to 102_N. The processing units also share one or more levels of common cache 103 and a deeper system memory 104. The collective goal of the cache levels 102_1 to 102_N, 103 is to minimize accesses to the shared memory 104 by keeping in the caches data items and instructions that are apt to be called upon by the processing units 101_1 to 101_N. However, as it is entirely possible that the respective program code running on the different processing units 101_1 to 101_N may wish to concurrently use a same item of data, a "coherency" protocol is implemented to ensure that the item of data remains "consistent" within the computing processor/system 100 as a whole.

A commonly used coherency protocol is the MESI protocol. The MESI protocol assigns one of four different states to any cached data item: 1) Modified (M); 2) Exclusive (E); 3) Shared (S); and, 4) Invalid. A cache line in the M state corresponds to a "dirty" cache line having recent, updated data that has not yet been updated to a deeper caching level (i.e., towards shared memory 104) or updated to memory 104 outright. Here, it is worthwhile to point out that in a typical implementation each caching level can support an M state for a particular cache line address. That is, a same cache line address can be in the M state in each of the caching levels. In this case, each higher level (i.e., toward the processing units), represents a more recent change to the cache line's data.

A cache line in the E state corresponds to data that is "clean". That is, its data content is the same as its corresponding entry (i.e., same address) in shared memory 104. When new data is written to a cache line in the E state (e.g., by a processor directly at the highest caching level, or, when an evicted cache line from a next higher level is received at an intermediate caching level), the state of the cache line is changed to the M state.

When a cache line is in the M state and the cache line is evicted, the cache line's data must be written back to a next deeper caching level or to shared memory 104. If written back to a next deeper caching level it remains in the M state at the next deeper caching level. If written back to shared memory it can transition to the E state. While a cache line is in the M state, a processing unit is permitted to access the cache line (e.g., by way of a cache snoop) and even update it (write a new value to the cache line). According to one MESI implementation, a snoop of a cache line in the M state for a simple read causes the cache line state to transition from the M state to the S state. A read of the cache line with an intent to write back to it ("read-for ownership") causes the cache line to transition from the M state to the I state.

A cache line in the S state typically corresponds to a cache line having multiple copies across the various caches 102_1 to 102_N, 103. In a typical situation, a single instance of a cache line is resident in the E state in the cache of a particular processor. If another processor desires the same cache line, a second copy of the cache line is sent to the requesting processor. The state of the cache line therefore changes from E to S as there are now two copies of the cache line in the system each having the same data as resides in shared system memory 104 for the associated address. Other aspects of the MESI protocol exist, however, such features are well know and need not be discussed here.

FIG. 2 shows an example of a processing unit 201_1 accessing a modified cache line from the (e.g., highest level of the) shared cache 203. As observed in FIG. 2, in a first cycle, the processing unit issues 1 a request for the cache line to the shared cache 203. The cache 203, during a second cycle, in response, reads 2 the cache line from the cache 203. In a third cycle, the cache line is presented 3 to the requesting processing unit 201_1. Notably, the cache line remains in the M state.

FIGURES

The present invention is illustrated by way of example and not limitation in the figures of the accompanying drawings, in which like references indicate similar elements and in which.

DETAILED DESCRIPTION

Designers are increasingly seeking to expand the capabilities of the processing units within a particular processor or system. As such, designers often seek to add "speculation" into the processing units. As a processing unit includes logic circuitry that can execute one or more threads of program code, speculation corresponds to the ability of a processing unit to "guess" as to what direction the program code will take (e.g., upon a conditional branch instruction). After the processing unit guesses at what direction the program code will take, the processing unit continues to execute instructions along the "guessed" path. Eventually the processing unit determines whether the guess was correct. If the guess was correct, the processing unit continues to execute program code along the guessed path. If the guess was incorrect, the processing unit "rolls back" its internal state information to the point of the guess. The processing unit then proceeds to execute program code along the correct path from the point of the incorrect guess.

Figure 3:
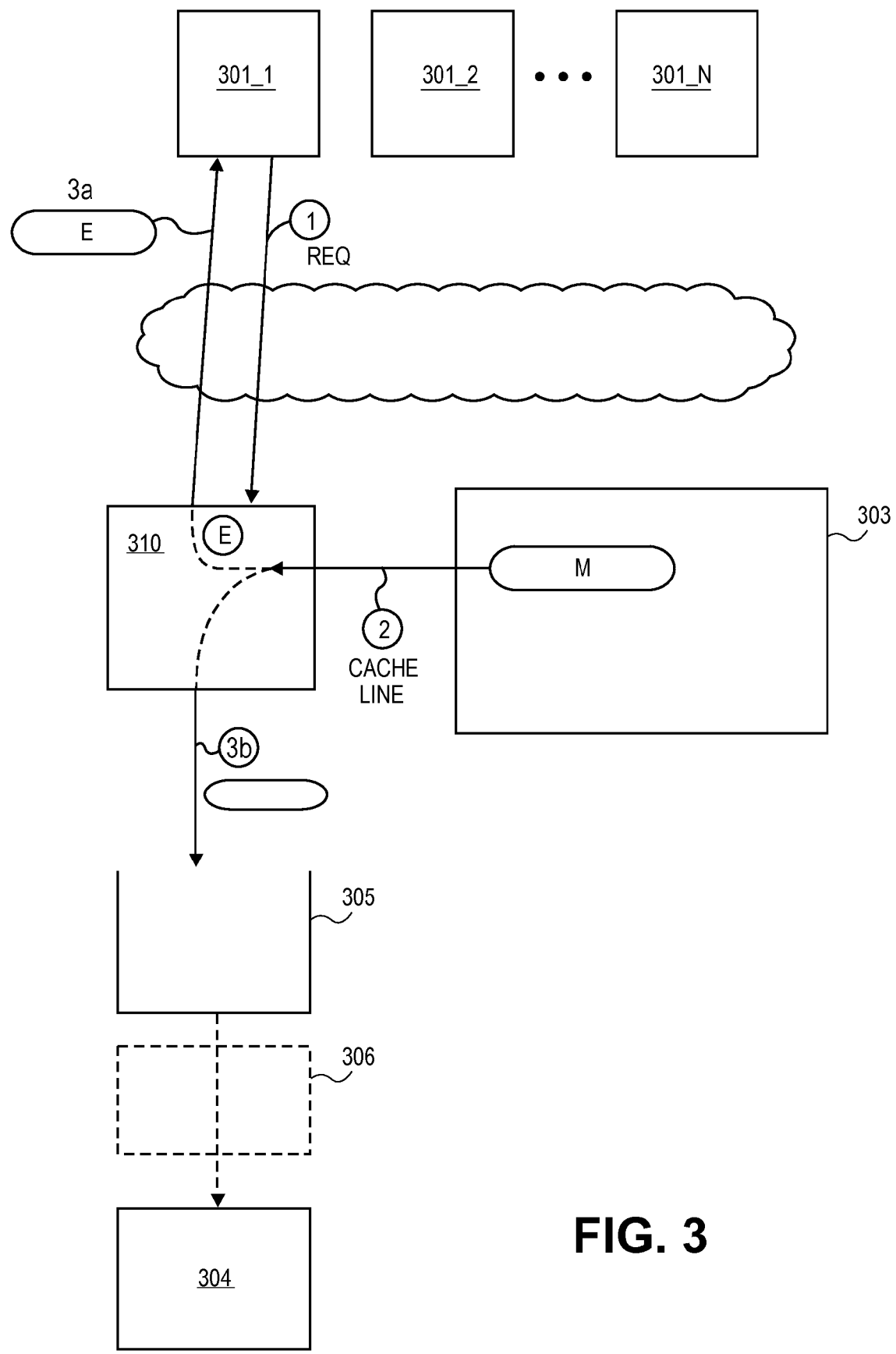
FIG. 3 shows an improved approach for performing a load operation.

FIG. 3 shows an improved process for speculatively executing code. As observed in FIG. 3, the improved process integrates two processes into the access of a cache line that is in the M state in the case of a read (also referred to as a "load"). These are, upon reading 2 the cache line from the cache 303 and recognizing that the cache line is in an M state, logic circuitry 310: i) transitions the cache line from the M state to the E state before it is provided to the requesting processing unit 3a; and, ii) automatically enters 3b the cache line into a write buffer 305.

Here, it is noteworthy that once execution into a speculative realm has started and speculative code accesses a cache line in the M state with the potential to change the data of the cache line, the cache line's data must be saved. If the cache line's data were not saved and the speculative code changed the data in the cache line, the machine would not be able to rollback to its internal state at the point of the guess (because the only copy of the data for the cache line's address at that point, as signified by its being in the M state, was later modified by the speculative code).

In an embodiment, the entering 3a of the cache line into the write buffer 305 causes the cache line to be saved in a deeper level of cache 306 or system memory 304. The saving of the cache line in this manner essentially saves the state of the data for the cache's line's associated system memory address at the moment that non speculative operation ended. If the machine later determines that it guessed wrong, the machine can return to its state at the point of the incorrect guess for this system memory address by referring to the data that has just been saved.

Notably, the approach of FIG. 3 is believed to enhance processor performance in the sense that the process of entering 3b the cache line's data into a write buffer 305 and saving it to deeper storage 306/304 can be performed concurrently (e.g., simultaneously) with the providing 3a of the cache line to the requesting processing unit 301_1 and/or the processing unit's use of the data within the cache line. For example, in one embodiment, the data is presented to the requesting processing unit 301_1 in the same cycle that the data is entered into the write buffer 305. The data may subsequently be operated on by the requesting processing unit 301_1 including being changed by the requesting processing unit (or even other processing units that subsequently gain access to the cache line) while the cache line's original data is in the process of migrating through the write buffer 305 to its storage location in deeper cache 306 or system memory 304.

As such, there is no apparent delay in the cache accessing process from the perspective of the requesting processing unit 301_1 even though the data in the cache line needs to be saved to deeper storage 306/304 because the processing unit 301_1 is executing speculative code. Speculative code can therefore benefit from a cache hit much the same in terms of accessing time as non speculative code. Because the requested cache line is actually provided to a requesting processing unit 301_1, the read from the cache for speculative code is essentially allowed to complete and can therefore be said to be "non-blocking".

Figure 4:
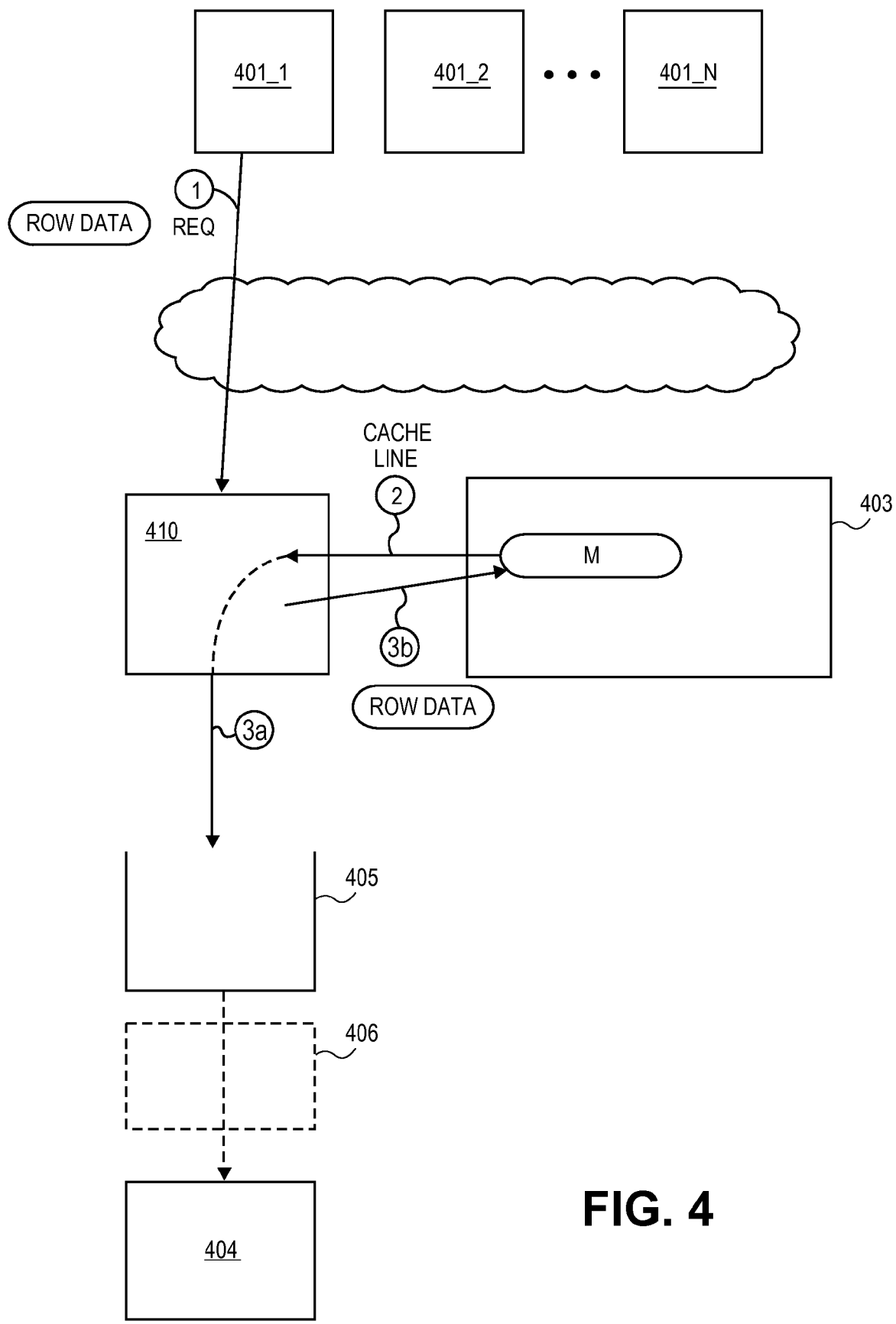
FIG. 4 shows an improved approach for performing a store operation.

FIG. 4 shows the corresponding process for a write or "store" of new information by speculative code over data in a cache line that is in an M state. As observed in FIG. 4, processing unit 401_1 presents new data for a particular system memory address with a request to write the new data into the corresponding cache line if it is found in the cache 403. If the cache line is found in the cache it is read from the cache 2 and, if it is in the M state, logic circuitry 410 directs 3a it to the write buffer 405. Logic circuitry 410 also causes the new data to be written 3b into the cache line in the cache 403. The cache line can remain in the M state in this instance. Again, the store process is non-blocking as the write operation is allowed to complete. In an embodiment, the new data is written into the cache 3b in the same machine cycle that the data to be saved is entered into the write buffer 405.

In a further implementation, the performance of the load and store processes just discussed above are essentially made selectable. That is, nominally, a process to store an accessed cache line in the M state into deeper storage (and convert the cache line to the E state) is not automatically triggered unless specifically requested. In an embodiment, a processing unit has logic circuitry to specifically request these processes (e.g., as part of the snoop request into the cache, or, by signaling enablement of the special processes to circuitry 310/410) whenever the processing unit is executing speculative code. That is, for example, the processing unit is designed to request these special processes in response to the machine making a guess as to what direction the program code will take.

As such, in various embodiments, the machine will request the special store process of FIG. 3 whenever the machine recognizes that it is speculatively pre-fetching data or instructions, or performing any "transactional" operations that speculatively perform certain tasks leading up to a "commit" point at which a decision is made as to whether the state of the machine created by the transactional tasks should be "committed" (i.e., considered as correct and final operations).

In an embodiment, no distinction is drawn between a "basic" M state and an M state created such that it can be discarded (e.g. as part of a transaction). Here, such a state may be referred to as "E+W" to indicate that the line is exclusive from a coherence standpoint but contains speculative data that is not yet visible to other agents. When a "commit" occurs, the state for all such lines related to that transaction convert from E+W to M.

Note that for ease of illustration, the processes above have been depicted with processing unit 301_1, 401_1 accessing a shared caching level 303. These same processes are also readily performed if the processing unit 301_1, 401_1 is accessing, either by way of load or store, an internal caching level of the processing unit 301_1, 401_1 such as its highest level (L1) cache.

Figure 5A:
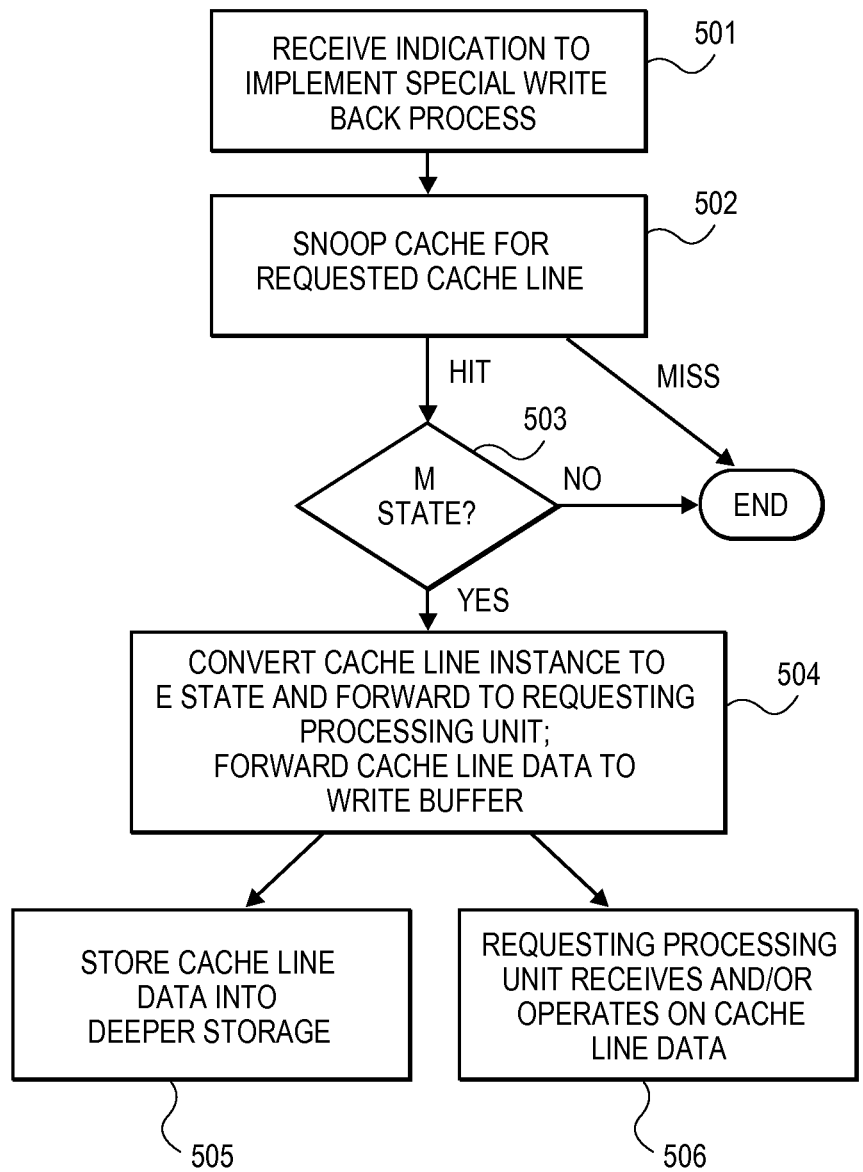
FIGS. 5a, 5b show flow diagrams pertaining to the improved approaches of FIGS. 3 and 4.
Figure 5B:
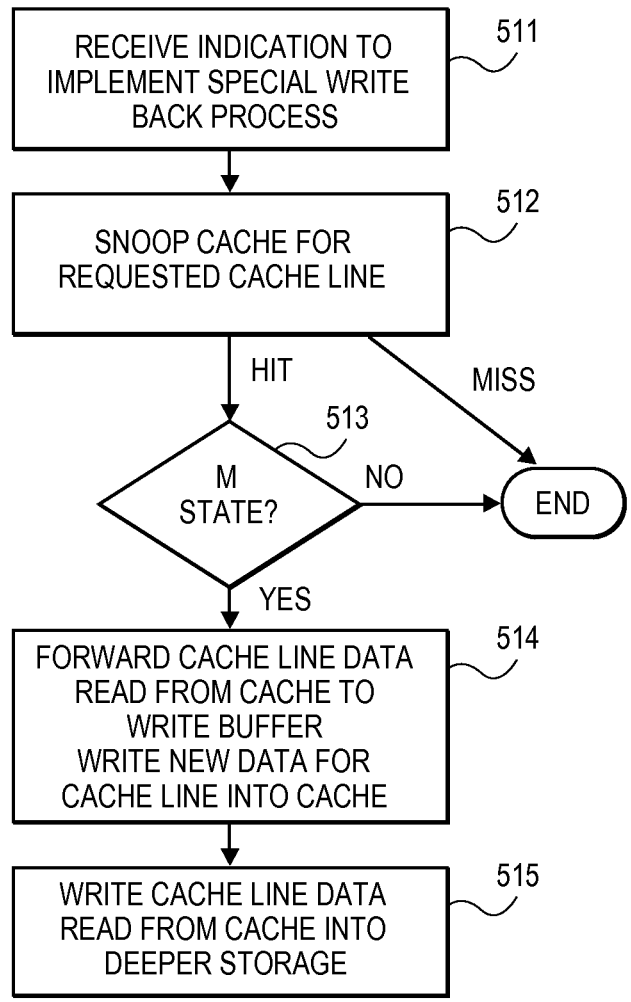

FIGS. 5a and 5b show flow diagrams illustrating the load and store processes described above with respect to FIGS. 3 and 4. As observed in the load process of FIG. 5a, an indication to implement the special automatic write back process for a particular load operation is received or otherwise recognized 501. The cache is then snooped for the requested cache line 502. If the result is a cache miss the process ends (e.g., but restarts at the next deeper cache level).

If the result is it a cache hit, the state of the cache line is inquired into 503. If the cache line is in the E, S, or I state (or perhaps some other state for coherency protocols that are not strict MESI protocols), the special write back process is not triggered. If the cache line is in the M state, the state of the cache line useable to the processing unit(s) is converted to E, a first copy of the cache line is forwarded to the write back buffer and a second copy of the cache line is forwarded to the requesting processing unit 504. The first copy of the cache line is stored in deeper cache or system memory 505 and the requesting processing unit receives and/or operates on the second copy of the cache line 506 which may include changing the data of the cache line. Processes 505, 506 may be performed, at least partially, concurrently (e.g., simultaneously) with one another.

As observed in the store process of FIG. 5b, an indication to implement the special automatic write back process for a particular load operation is received and/or otherwise recognized 511. The cache is then snooped for the requested cache line 512. If the result is a cache miss the process ends (e.g., but restarts at the next deeper cache). If the result is it a cache hit, the state of the cache line is inquired into 513. If the cache line is in the E, S, or I state (or perhaps some other state for coherency protocols that are not strict MESI protocols), the special write back process is not triggered. If the cache line is in the M state, the copy of the cache line that was just read from cache is forwarded to the write back buffer and the second copy of the cache line received from the requesting processing unit having new data is written into the cache 514. In an embodiment, the cache line remains in the M state. The first (original) copy of the cache line is stored in deeper cache or system memory 515. Conceivably, the same or other processing unit may request the cache line having the new data from the cache and operate on it (including changing it) concurrently with the first original copy of the cache line being saved into deeper storage.

As the processing unit(s) execute speculative code or, for whatever reason, it is decided that just performed transactional operations should not commit, the machine needs to transition back to its previous state. Here, referring back to FIGS. 3 and 4, logic circuitry 310/410 has additional logic circuitry that keeps track of which cache lines where accessed while the machine was operating in speculative/transactional mode. Upon a need to return to its previous state, the additional logic circuitry knows that any cache lines accessed during speculative/transactional mode in the M state have been saved to deeper storage. Any non accessed cache lines (including but not limited to cache lines in the M state) can remain in the cache. All other cache lines, e.g., all cache lines accessed during speculative/transactional mode that were in the E, S or I state at the start of speculative/transactional execution can be put into an invalid state I.

Figure 6:
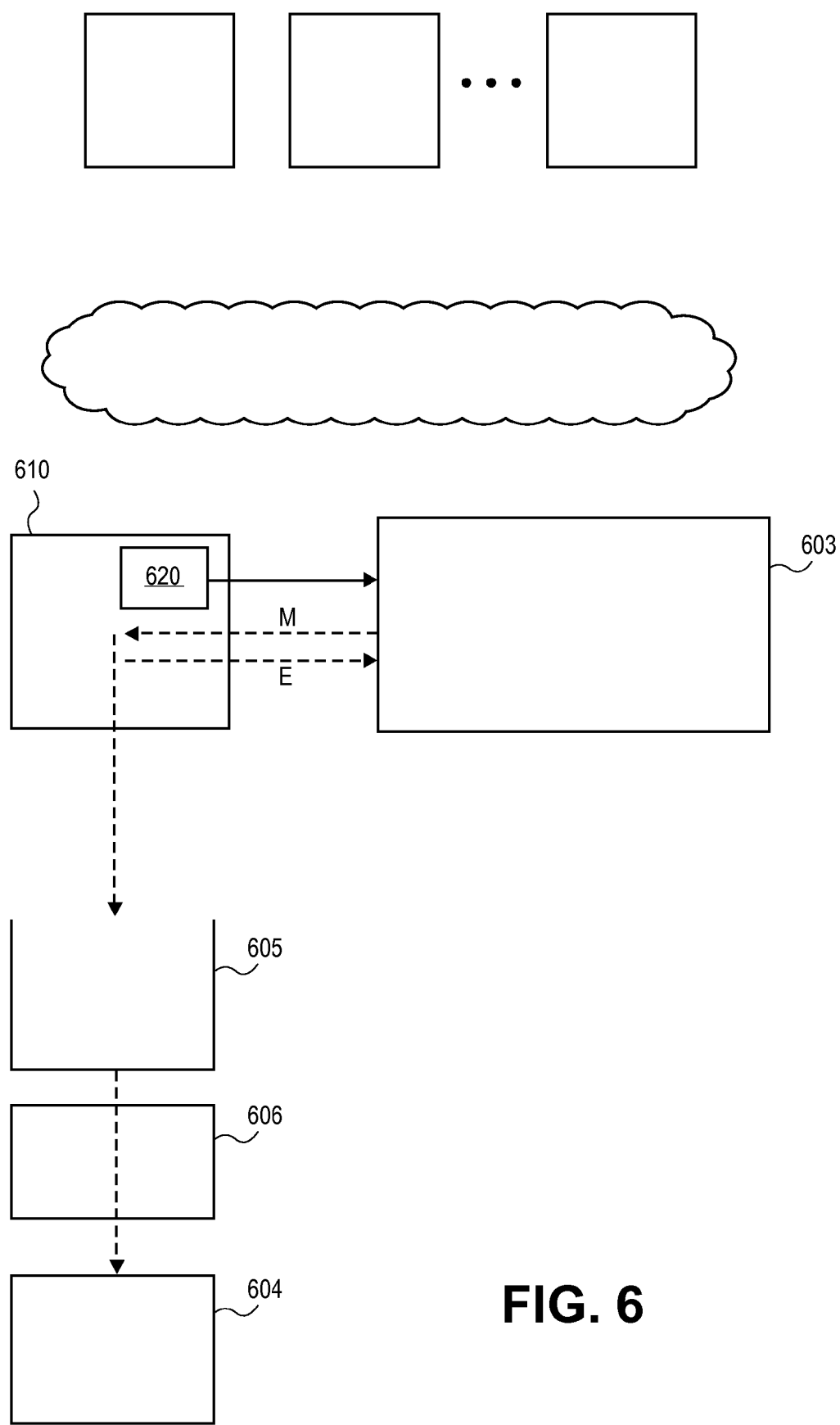
FIG. 6 shows another improved approach.

FIG. 6 pertains to another approach that can be used in combination with or alternatively to the approaches discussed above. As observed in FIG. 6, scroll logic 620 scrolls through the cache 603 on its own accord without any specific request or cache snoop for any particular cache line from a processing unit. For example, the scroll logic may simply read (e.g., periodically, intermittently, opportunistically) cache lines from the cache 603 until all cache lines have been read from the cache. Those cache lines that are in the M state are forwarded to the write back buffer 605 and a copy is changed to the E state and rewritten back into the cache. The cache lines that are forwarded to the write back buffer 605 are ultimately written into deeper cache storage 606 or system memory 604.

In one embodiment, the scroll logic operates as a background process in combination with the approaches discussed above in FIGS. 3 through 5*a,b*. In another embodiment, scroll logic 620 is the only mechanism to save cache lines in the M state at the start of speculative code. In this case, a cache line is not free for use by speculative code until the scroll logic has had a chance to access it. As such, if speculative code causes a processing unit to request a cache line that has not yet been accessed by the scroll logic, the request will remain unserviced until the scroll logic has had a chance to access it and write it back to the cache in the E state if it was in the M state. In this case, the start of speculative code execution may be slower as responses to cache line requests sit unanswered until the scroll logic is able to scroll through to the specific requested cache line locations. Once the scroll logic is able to scroll completely through the cache, all such delays are eliminated going forward. In an embodiment, scroll logic is nominally disabled and only wakes up and put into operation upon the entry into a speculative code region.

Another implementation feature of the special processes described above is that a cache level may be designed to not enter one of its cache lines into the write buffer if it knows there is an instance of a cache line in an M state at a higher caching level and a the same system memory address. In this case, saving the data to deeper storage would be wasteful because more recent data exists in the caching hierarchy above it.

Note that the special load and store techniques discussed above can also be used outside of a speculative execution context (that is, as part of the processing of non speculative code). One such instance is to reduce soft-error rates. Soft-errors are errors caused by faulty data being loaded/stored to/from a caching level. When "bad data" is detected, the program code usually jumps to some form of error handler program code that determines where operation should next flow. Execution of the error handling program essentially corresponds to reduced performance of overall program execution.

The recovery process from a soft-error can be greatly enhanced in the case of non-speculative executing code if a series of "snapshots" of program state are taken during program execution. Should a soft-error arise, the program state needs to only jump back to its most recent snapshot. Here, the processes described above can be used to essentially take snapshots of program state with the only modification being that whereas, before the special processes were activated with the onset of speculative code execution and de-activated with the closure of speculative execution, in this case, the processor contains logic circuitry that recognizes that the special processes begin when a next snapshot is to be taken and end when that snapshot is complete. The amount of time/code that determines a snapshot size is effectively a matter of designer choice.

Another application of the processes discussed above is a "turbo-mode" or other higher performance mode in which additional power consumption is deemed acceptable because additional processor performance is desired. Here, the special processes are executed in the background as a form of "cache cleaning" that, from the processing units view, presents more cache lines in the E state than what would otherwise be observed if the special processes were not activated. Effectively presenting the processing units with more cache lines in the E state permits the processors to write new data with fewer restrictions or at least imparting fewer restrictive effects on the overall system. In the case the processor contains logic circuitry that activates the special processes responsive to a power configuration setting of the processor.

In an embodiment, a single processor is designed to support more than one of these techniques as different configuration settings. For example, in model specific register (MSR) space different settings are available to establish for which purpose the special processes are to be applied (e.g., any of speculative execution, soft error rate reduction, high performance cache cleaning).

Figure 7:
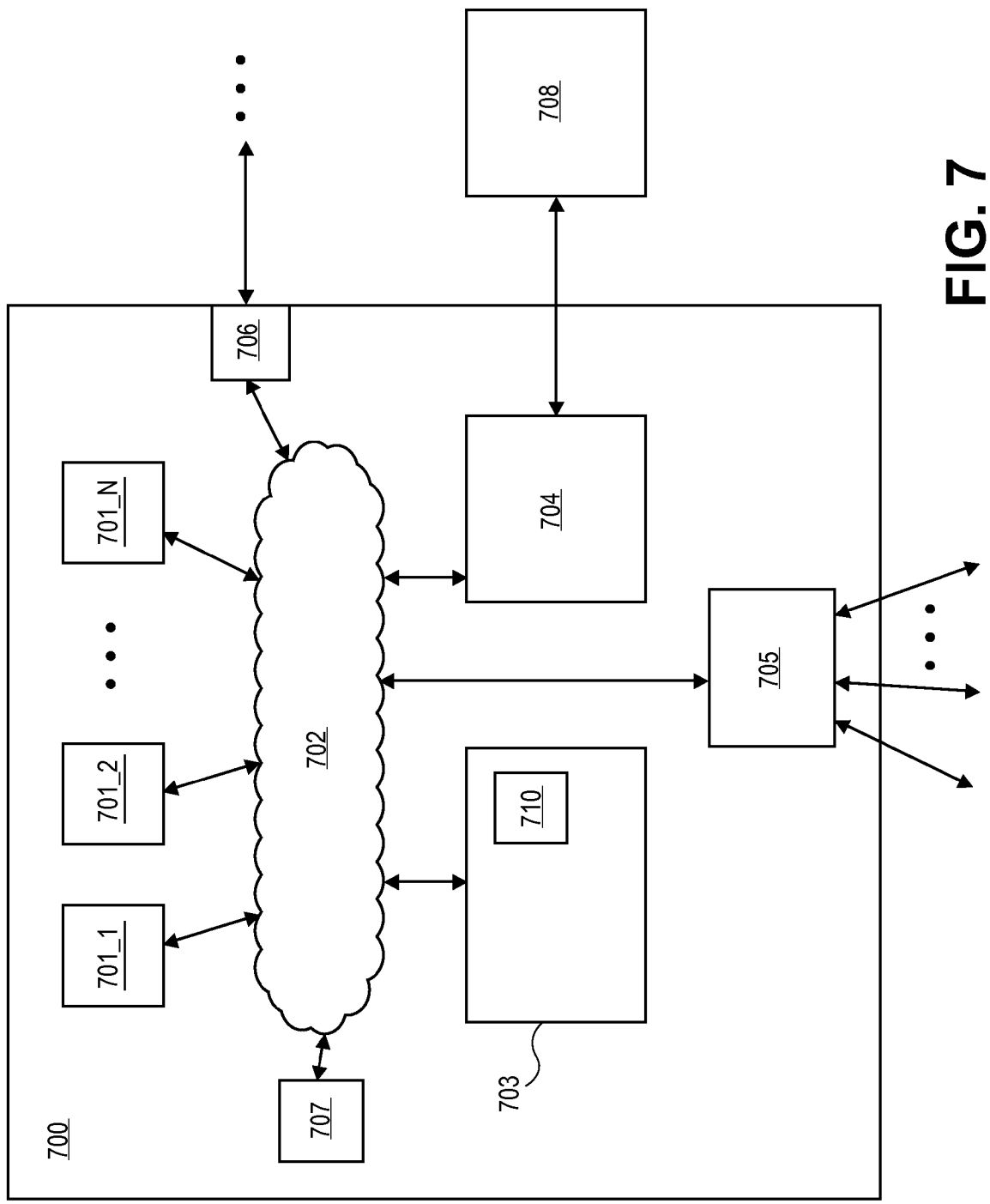
FIG. 7 shows an exemplary processor.

FIG. 7 shows the architecture of a standard multi-core processor design 700 implemented in a semiconductor chip that is enhanced to include the special processes discussed above. As observed in FIG. 7, the processor includes: 1) multiple processing cores 701_1 to 701_N; 2) an interconnection network 702; 3) a last level caching system 703; 4) a memory controller 704 and an I/O hub 705. Each of the processing cores 701_1 to 701_N contain one or more instruction execution pipelines for executing program code instructions. The interconnect network 702 serves to interconnect each of the cores 701_1 to 701_N to each other as well as the other components 703, 704, 705, 706.

Figure 1:
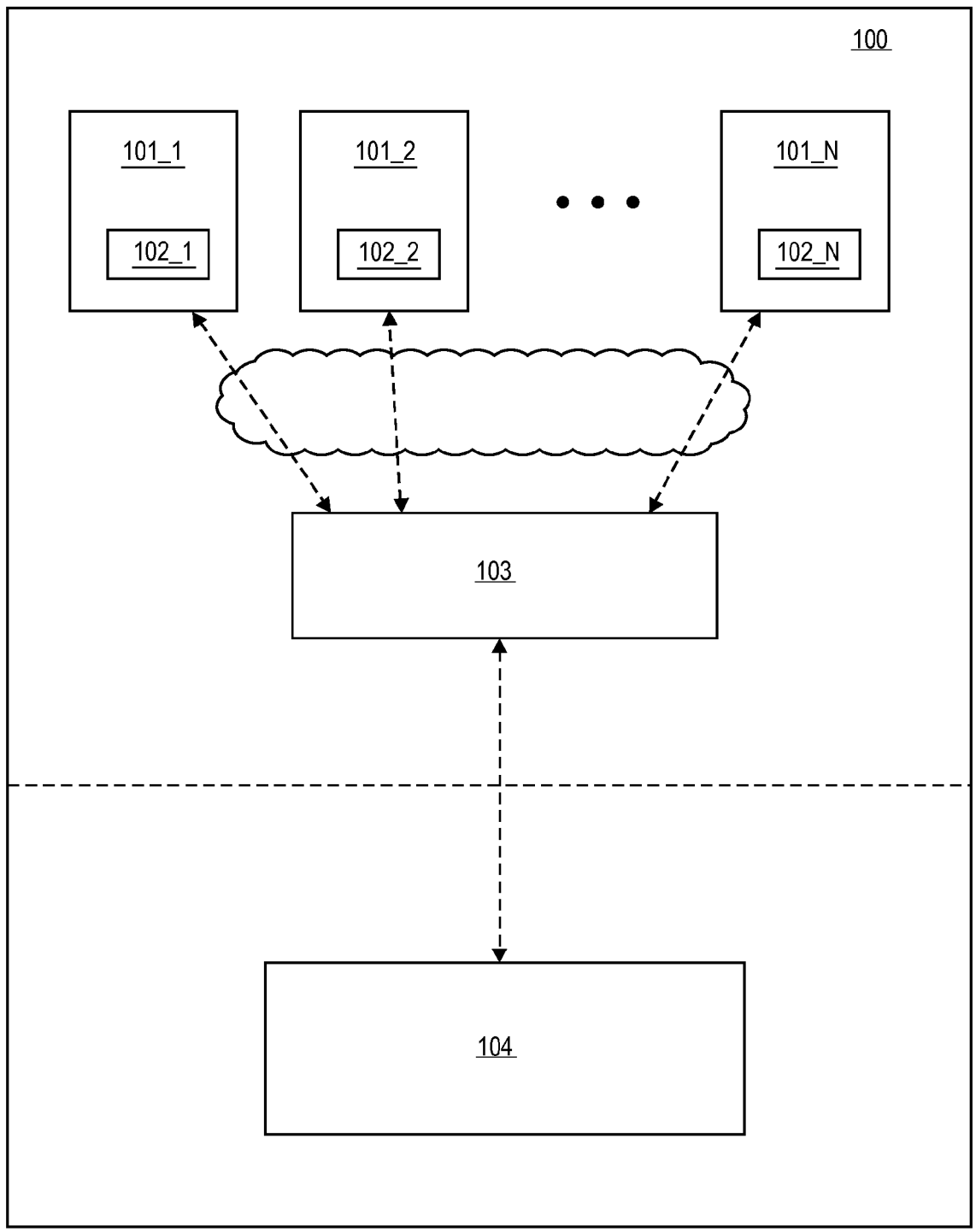
FIG. 1 shows a plurality of processing units and a shared cache.
Figure 2:
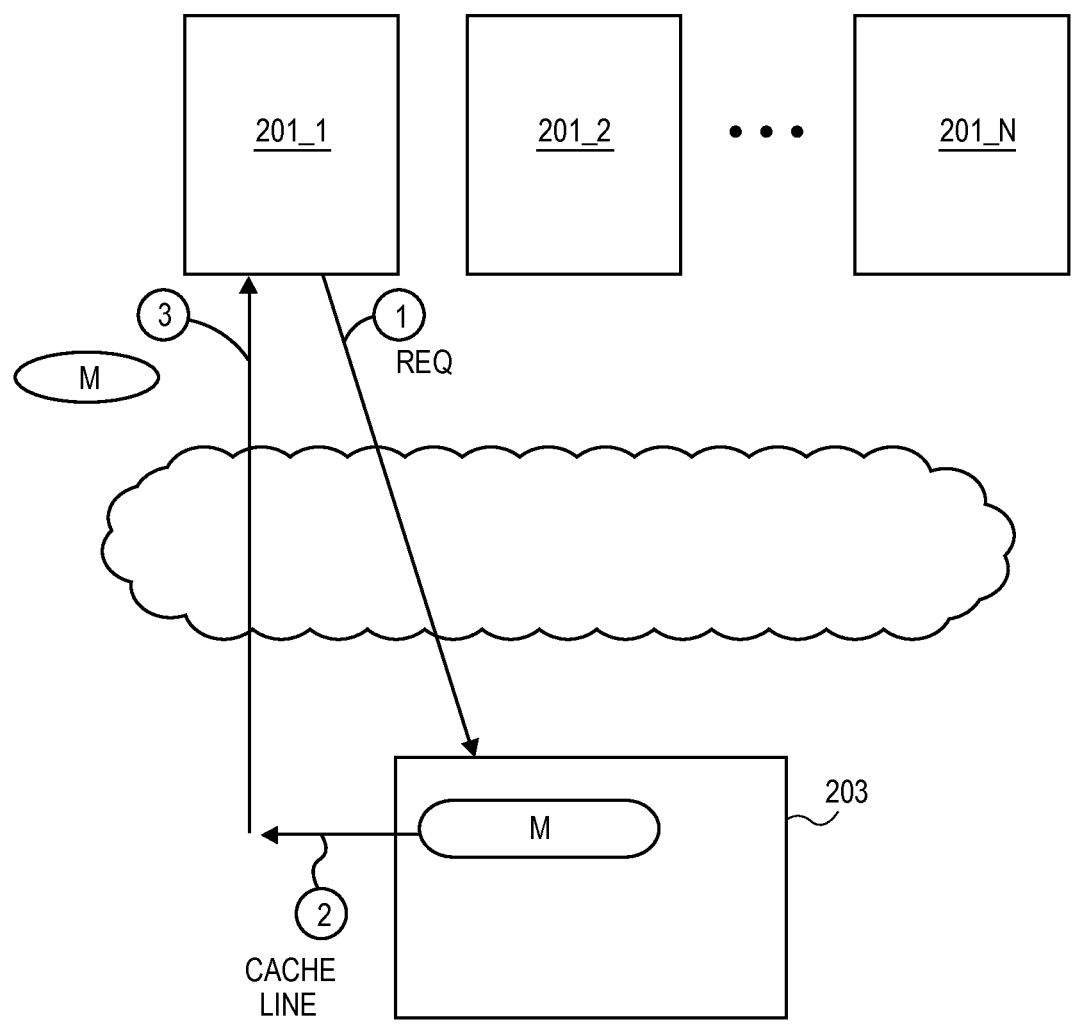
FIG. 2 shows an example of a processing unit accessing a cache line.

The last level caching system 703 serves as a last layer of cache in the processor before instructions and/or data are evicted to system memory 708. The memory controller 704 reads/writes data and instructions from/to system memory 706. The I/O hub 105 manages communication between the processor and "I/O" devices (e.g., non volatile storage devices and/or network interfaces). Port 706 stems from the interconnection network 702 to link multiple processors so that systems having more than N cores can be realized. Graphics processor 707 performs graphics computations. Other functional blocks of significance (phase locked loop (PLL) circuitry, power management circuitry, etc.) are not depicted in FIG. 1 for convenience. Logic circuitry 710 can be viewed as any combination of the logic circuitry 310, 410, 610 discussed above. The write buffer (not depicted) may be integral to the logic circuitry of the last level cache or system memory controller 704. In the particular configuration of FIG. 7 the deeper storage used to save cache lines corresponds to system memory 708. Processors with more levels of shared caching can move the functionality of logic 710 to a shared cache other than the last level cache so that the deeper storage can be a cache rather than system memory.

In the foregoing specification any of the components and/or processes discussed above can be implemented with electronic circuitry such as a logic circuitry disposed on a semiconductor chip which may include micro-controller circuitry that executes small foot print program code to implement the specific functions that are performed. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A processor comprising:
a plurality of processing cores;
a cache communicatively coupled to the processing cores, the cache to store cache lines; and
logic circuitry associated with the cache to perform the following in a same cycle in response to a request for a memory operation from one of the processing cores that is directed to a cache line in the cache:
read the cache line from the cache, and if the cache line is in a modified cache coherency protocol state, forward a copy of the cache line to a write buffer of circuitry that is to cause the copy of the cache line to be written to deeper storage, change the cache line in the cache to an exclusive cache coherency protocol state, and perform the memory operation.

2. The processor of claim 1 wherein, if said memory operation is a load operation, said logic circuitry is to forward said cache line to said one of the processing cores.

3. The processor of claim 2 wherein said cache line is operated upon by said one of the processing cores while said copy of the cache line is at least one of forwarded toward and written into said deeper storage.

4. The processor of claim 1 wherein if said memory operation is a store operation, said logic circuitry is to write new data to said cache line in said cache.

5. The processor of claim 4 wherein said cache line is to be at least one of accessed and operated upon by any of said processing cores while said copy of the cache line is at least one of forwarded toward and written into said deeper storage.

6. The processor of claim 1 wherein each of said processing cores includes an instruction execution pipeline.

7. The processor of claim 6 wherein said logic circuitry is enabled to perform said read, forward, and change by way of communication from one of said processing cores.

8. The processor of claim 1 wherein said deeper storage is a deeper level of cache.

9. The processor of claim 1 wherein said deeper storage is system memory.

10. A computing system comprising:
a plurality of processors;
a cache communicatively coupled to the processors; and
logic circuitry associated with the cache to perform the following in a same cycle in
response to a request for a memory operation from one of the processors that is directed to a cache line in the cache:
read the cache line from the cache, and if the cache line is in a modified cache coherency protocol state, forward a copy of the cache line to a write buffer of circuitry that is to cause the copy of the cache line to be written to deeper storage, change the cache line to an exclusive cache coherency protocol state, and perform the memory operation.

11. The computing system of claim 10 wherein, if said memory operation is a load operation, said logic circuitry is to forward said cache line to said one of the processors.

12. The computing system of claim 11 said cache line is operated upon by said one of the processors while said copy of the cache line is at least one of forwarded toward and written into said deeper storage.

13. The computing system of claim 10 wherein if said memory operation is a store operation, said logic circuitry is to write new data to said cache line in said cache.

14. The computing system of claim 13 wherein said cache line is to be at least one of accessed and operated upon by any of said processors while said copy of the cache line is at least one of forwarded toward and written into said deeper storage.

15. The computing system of claim 10 wherein said deeper storage is a deeper level of cache.

16. The computing system of claim 10 wherein said deeper storage is system memory.

17. A method comprising:
performing the following in a same cycle in response to a request for a memory operation from a processing unit that is directed to a cache line in a cache:
reading the cache line from the cache, and if the cache line is in a modified cache coherency protocol state, forwarding a copy of the cache line to a write buffer of circuitry that is to cause the copy of the cache line to be written to deeper storage, changing the cache line in the cache to an exclusive cache coherency protocol state, and performing the memory operation.

18. The method of claim 17 wherein, if said memory operation is a load operation, forwarding said cache line to said processing unit.

19. The method of claim 18 wherein said cache line is operated upon by said processing unit while said copy of the cache line is being at least one of forwarded toward and written into said deeper storage.

20. The method of claim 17 wherein if said memory operation is a store operation, further comprising writing new data to said cache line in said cache.

21. A processor comprising:
a plurality of processing cores;
a cache communicatively coupled to the processing cores, the cache to store cache lines; and
logic circuitry associated with the cache to perform the following in a same cycle in response to a request for a process from one of the processing cores that is directed to a cache line in the cache:
read the cache line from the cache, and if the cache line is in a modified cache coherency protocol state, forward a copy of the cache line to a write buffer of circuitry that is to cause the copy of the cache line to be written to deeper storage, change the cache line in the cache to an exclusive cache coherency protocol state, and perform the process, wherein the process comprises at least one of:

speculative execution, soft error rate reduction, and high performance cache cleaning.

22. The processor of claim 1, wherein the memory operation is a transactional operation.

23. The computing system of claim 10, wherein the memory operation is a transactional operation.

24. The method of claim 17, wherein the memory operation is a transactional operation.

\* \* \* \* \*